US006559426B2

(12) United States Patent  (10) Patent No.: US 6,559,426 B2
Jirmann  (45) Date of Patent: May 6, 2003

(54) ELECTRIC HEATING DEVICE FOR A VEHICLE

(75) Inventor: Horst Jirmann, Coburg (DE)

(73) Assignee: Valeo Klimasysteme GmbH, Rodach (DE)

(*) Notice: Subject to any disclaimer, the term of this patent is extended or adjusted under 35 U.S.C. 154(b) by 0 days.

(21) Appl. No.: 09/500,012

(22) Filed: Feb. 8, 2000

(65) Prior Publication Data
US 2001/0040159 A1 Nov. 15, 2001

(30) Foreign Application Priority Data

Feb. 8, 1999 (DE) .......................... 199 05 074

(51) Int. Cl.$^7$ ............................... H05B 1/02
(52) U.S. Cl. ................. 219/480; 219/486; 219/202
(58) Field of Search ............... 219/480, 486, 219/487, 508, 203, 202; 307/10.1, 39

(56) References Cited

U.S. PATENT DOCUMENTS

| 1,716,791 A | * | 6/1929 | Ness ........................ 219/486 |
| 2,087,776 A | * | 7/1937 | Morley ...................... 219/202 |
| 2,263,420 A | * | 11/1941 | Hammel ..................... 219/486 |
| 2,843,759 A | * | 7/1958 | Roots ........................ 219/486 |
| 2,932,715 A | * | 4/1960 | Weeks ....................... 219/486 |
| 3,005,109 A | * | 10/1961 | Funkhouser et al. ........ 219/486 |
| 4,160,153 A | * | 7/1979 | Melander .................... 219/485 |
| 4,864,100 A | * | 9/1989 | Cicak ........................ 219/203 |
| 5,233,227 A | * | 8/1993 | Kajimoto et al. ............ 307/39 |
| 5,233,342 A | * | 8/1993 | Yashiro et al. ......... 340/825.06 |
| 5,543,666 A | * | 8/1996 | Priesemuth ................. 307/39 |
| 5,990,459 A | | 11/1999 | Feustel et al. |
| 6,191,505 B1 | * | 2/2001 | Matsuyama ................. 307/130 |

FOREIGN PATENT DOCUMENTS

| DE | 3146383 | * | 5/1983 | |
| DE | 3218161 | * | 11/1983 | ................. 219/486 |
| DE | 33 32 696 | | 3/1985 | |
| DE | 35 09 073 | | 9/1985 | |
| DE | 3808241 | * | 9/1989 | |
| EP | 350 528 | | 4/1992 | |
| EP | 837 381 | | 4/1998 | |
| FR | 2433254 | * | 4/1980 | |
| FR | 2 742 384 | | 6/1997 | |
| GB | 721246 | * | 1/1955 | ................. 219/486 |
| JP | 3-108293 | * | 5/1991 | |
| SE | 55146 | * | 10/1918 | ................. 219/486 |
| WO | 9529572 | * | 11/1995 | |

* cited by examiner

Primary Examiner—John A. Jeffery
(74) Attorney, Agent, or Firm—Morgan & Finnegan, LLP

(57) ABSTRACT

A device and method is shown for electrically heating a vehicle. The heating device has positive temperature coefficient (PTC) heating thermistors connected in groups, and a circuit for selectively turning on one or more groups. At least two of the groups have different rated heating powers. The circuit turns on the selection of the groups at least on the basis of the available electrical power.

5 Claims, 1 Drawing Sheet

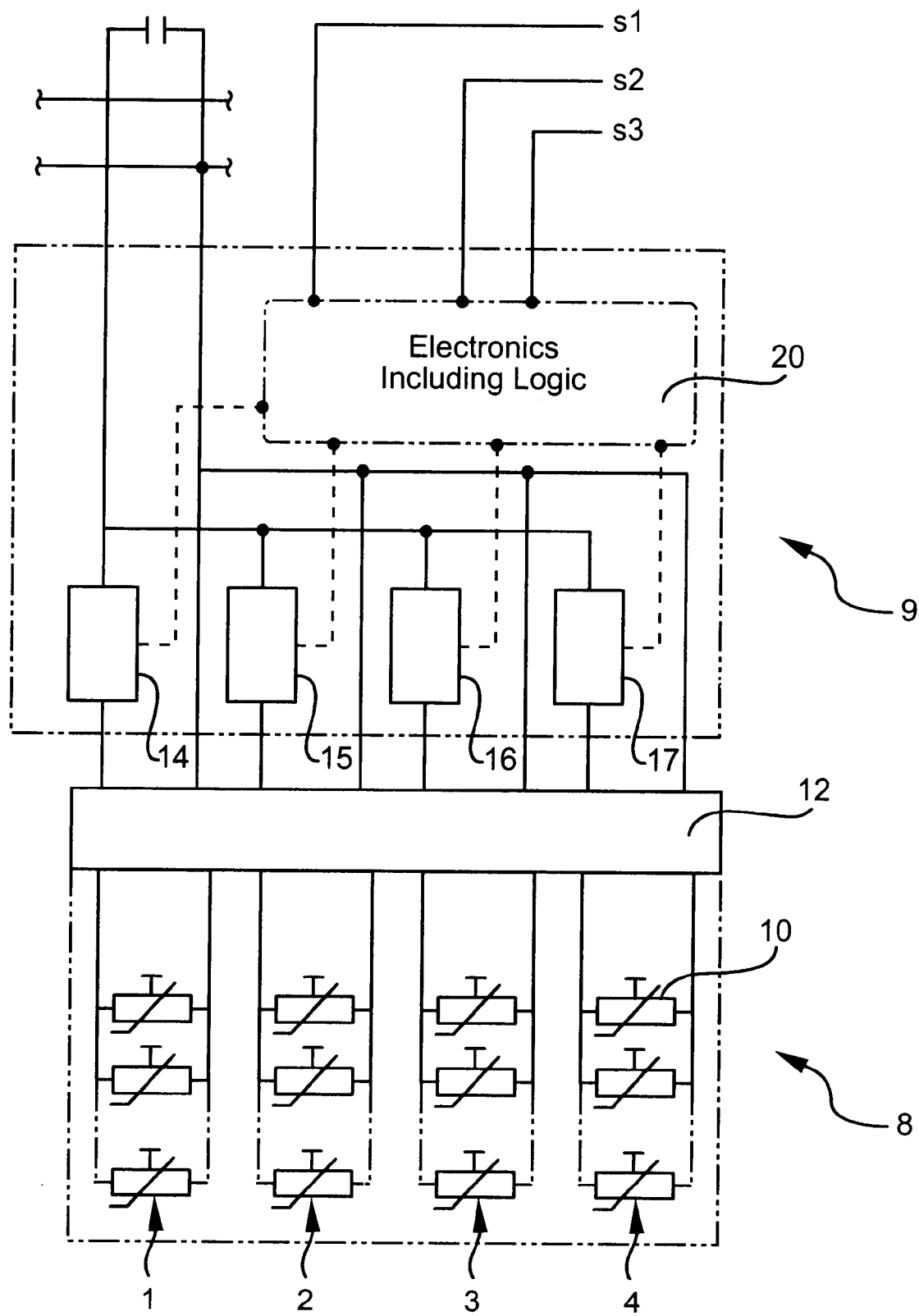

ELECTRIC HEATING DEVICE FOR A VEHICLE

FIELD OF THE INVENTION

The present invention relates to an electrical heating device, and in particular to a PTC heating device, for a vehicle, and to a method for electrically heating a vehicle.

BACKGROUND OF THE INVENTION

Besides the known heating/cooling circuits with corresponding heat exchangers, increasing use has been made of electrical heating devices in recent years for heating the passenger compartment of a vehicle. These can be used both as units for assisting known heat exchangers, and as units for replacing them. In order to convert electrical energy into heat, conventional heating resistors and so-called positive temperature coefficient thermistors (hereafter PTC heating thermistors) are generally used. It is also known to combine both types of resistors, see e.g. FR-A-2 690 112.

PTC heating thermistors have a resistance that changes significantly as a function of temperature. Above a threshold temperature, it increases steeply so that PTC heating thermistors provide a certain degree of self-regulation in the operating range, for which reason the use of PTC heating thermistors has gained popularity in recent years.

FR-A-2 742 384 discloses a heating device of the generic type having the features of the preamble of claim 1. This known device comprises a heat-exchanger body whose configuration is chosen in order to integrate PTC thermistors. The PTC thermistors are arranged and connected in groups. Individual or multiple groups can be turned on selectively by means of a circuit, e.g. in order to provide different temperatures for different regions of the heat exchanger.

Since, owing to different vehicle operating conditions, the levels of electrical power vary, very substantial power losses occur in the known devices, and there is also a risk of overloading the vehicle electrical system. In order to solve the aforementioned problems, various attempts have been made to provide an improved control system for PTC heating elements. These include, inter alia, the relay-controlled switching of heating circuits with equal power, as e.g. indicated in FR-A-2 742 384 cited above. Although this does provide at some degree of improvement in terms of the power loss that occurs, it cannot be regarded as any more than an interim solution.

An alternative approach consists in controlling the power continuously on the basis of pulse-width modulation. Although this method promises a low corresponding power loss, it unfortunately entails the disadvantage of additional sources of interference. The use of the linear controller has also been found to be unfeasible owing to the very high power losses.

OBJECTS OF THE INVENTION

The object of the invention is accordingly to develop an electrical heating device of the generic type, and a method of the generic type for electrically heating a vehicle, in such a way as to minimize the power loss, with the further intention of guaranteeing as continuous as possible an adjustment of the heating power. The device and the method are also intended to contain the fewest possible sources of interference, or to function with the least possible susceptibility to interference.

SUMMARY OF THE INVENTION

According to one aspect of the invention, there is provided an electrical heating device, in particular a PTC heating device, for a vehicle, having a plurality of heating resistors, in particular PTC heating thermistors, which are connected in groups, and having a circuit by means of which one or more groups can be turned on selectively, wherein the circuit turns on a selection of the groups at least on the basis of the available electrical power.

According to another aspect of the invention there is provided a method for electrically heating a vehicle by using electrical heating elements, in particular PTC heating elements, which are connected in groups, with the step of turning on one or more groups, wherein the said step of turning-on is carried out in relation to a selection of groups, at least on the basis of the available power.

The electrical heating device according to the invention is, in particular, preferably a PTC heating device for a vehicle. It comprises a plurality of heating resistors, in particular PTC heating thermistors, which are connected in groups. It further comprises a circuit by means of which one or more groups can be turned on selectively. The device according to the invention is distinguished in that at least two of the groups have different rated heating powers, and in that the circuit turns on, or supplies with electricity, a selection of the groups at least on the basis of the available electrical power.

The method according to the invention for electrically heating a vehicle by using electrical heating elements, in particular PTC heating elements, which are connected in groups, with the stept of turning on one or more groups, is distinguished in that at least two of the groups have different heating powers, and in that the stept of turning-on is carried out in relation to a selection of groups, at least on the basis of the available power.

The device according to the invention, and the method according to the invention, hence make it possible to select groups with different heating power, on the basis of the available electrical power, in order to obtain optimally efficient heating of the passenger compartment at all times, in particular in the operating range of the individual groups of PTC heating thermistors. Accordingly, overloading of the electrical system built into the vehicle and the occurrence of power losses can be prevented to all practical intents and purposes.

In order to make it possible to obtain a heating function even when the available electrical power is relatively low, the group with the lowest heating powers should advantageously provide a temperature increase, for the medium to be heated up, in particular air, of at most 1 kelvin in the operating range of the group of PTC heating thermistors.

Advantageously, the maximum difference in rated heating power between at least two groups provides a temperature increase, for the medium to be heated up, of at most 1 kelvin in the operating range, so that the heating power can be controlled continuously to all practical intents and purposes.

In a preferred embodiment, a total rated heating power graduation is provided, in particular with an increment which corresponds to a respective temperature increase, for the medium to be heated up, of at most 1 kelvin in the operating range, by means of respective selection. In other words, groups of PTC thermistors, or even conventional heating resistors, can be combined in such a way that various total rated heating powers can be obtained.

In a particularly preferred embodiment, the heating power of at least one group substantially satisfies the equation $$P_n = P_1 + (n-1) \times P_1$$

where, in a series of groups with different rated heating power in order of increasing heating power, n denotes one of the groups. Consequently, for example, the desired graduation of the total heating power may be obtained, in the case of four groups, by providing the first group with a rated power of 100 watts, a second group with a rated power of 200 watts, a third group with 300 watts and a fourth group with 400 watts of electrical power. In the example indicated, it is therefore possible to obtain total heating powers of up to 1000 watts with a 100-watt interval. If e.g. an electrical power of 900 watts is available from the vehicle electrical system, and the user desires and sets a maximum heating power, the groups with respective powers of 200 watts, 300 watts and 400 watts may be operated together, so as to provide an overall optimized efficiency.

In an alternatively preferred embodiment, the rated heating of a group satisfies the following equation $$P_n = 2^{(n-1)} \times P_1$$

where again, in a series of groups with different rated heating power in order of increasing heating power, n denotes one of the groups. Assuming a rated heating power $P_1=100$ watts for the first group, corresponding approximately to a temperature increase of 1 kelvin in the air flowing past, the group with the next heating power up has a rated electrical power of 200 watts. The following groups should then approximately have electrical powers of 400 and 800 watts. With this configuration of the individual groups as well, it is possible to graduate the total heating power with an increment equal to the smallest rated heating power, the maximum total rated heating power, if the vehicle can provide sufficient power, amounting to 15 times the rated heating power of the group with the lowest power.

Both in the device according to the invention and in the method according to the invention, the turning-on of individual groups may be carried out, as well as on the basis of the available electrical powers, also on the basis of sensor signals and/or of user-setting signals. The signals provided by means of sensors may, inter alia, comprise external temperature signals, passenger-compartment temperature signals and the like. The user-setting signals may, inter alia, cause the entire device to be switched on and off, or may lead to the desired thermostatic regulation within the limits of the available electrical power.

BRIEF DESCRIPTION OF THE DRAWING

Other advantages and features of the present invention can be found in the following detailed description of a currently preferred embodiment, with reference to the drawings, in which:

The FIGURE diagrammatically shows an electrical heating device in accordance with the invention.

DESCRIPTION OF THE PREFERRED EMBODIMENT

The device shown in the FIGURE is essentially formed by a circuit 9 and a heating element 8. In the embodiment shown, the heating element 8 is of the so-called PTC type. The interface between the circuit 9 and the heating element 8 is provided by a plug-in connector 12 in the embodiment shown.

The heating element 8 comprises a plurality of heating resistors 10 which, in the embodiment shown, are formed as so-called positive temperature coefficient heating thermistors. The individual heating resistors 10 are respectively connected in groups. In particular, groups 1, 2, 3, 4 are hence formed which, in the embodiment shown, are represented with three heating resistors each. Of the groups 1, 2, 3 and 4, at least two have a different rated heating power, it being possible to achieve this through an appropriate choice of the individual heating resistors 10, of the way in which they are positioned and of how many of them there are. The particular possible ways in which the individual groups may be configured differently in terms of rated heating power will be discussed in detail further on in the description.

In the embodiment shown, the control system 10 comprises four power switches 14, 15, 16, 17, which are each used to turn on one of the groups 1, 2, 3, 4. Each of the power switches 14, 15, 16, 17, is controlled by integrated electronics 20. The electronics 20 comprise a logic circuit, which evaluates signals that are input via signal lines S1, S2 and S3 and brings about corresponding actuation of the power switches 14, 15, 16, 17. In the embodiment shown, signals or a signal for assessing the capacity of the vehicle electrical system, i.e. signals that indicate or infer the available electrical power, are provided via the line S1. The optional lines S2 and S3 may respectively be provided for inputting signals to assess the thermostatic regulation of the interior, i.e. for example signals from external-air and internal-air temperature sensors, while the line S3 may be designed to input signals that are determined by a user's action.

It may be generally stated that the circuit 9 can turn on, or supply with electricity, individual or multiple groups 1, 2, 3, 4 by means of the power switches 14, 15, 16, 17, at least on the basis of the available electrical power.

In order to explain the invention more clearly, two examples will now be dealt with below, in which different heating powers are respectively provided for each group 1, 2, 3, 4.

In a first example, group 1 has an electrical power consumption, essentially corresponding to the rated heating power, of 100 watts. Groups 2, 3 and 4 respectively have a power of 200 watts, 300 watts and 400 watts. Accordingly, there is an essentially linear relationship between the heating powers of the individual groups 1, 2, 3, 4. For the sake of simplicity, it will now be assumed that the power available from the vehicle electrical system increases linearly from 0 to 1000 watts, which corresponds to the maximum power of the total heating element 8. As soon as the electronics 20 receive a signal which indicates that the electrical power available from the vehicle electrical system is between 100 and 200 watts, it switches the power switch 14 so that only group 1 is supplied with electricity, in order to provide a heating power of 100 watts. As soon as the electronics 20 detect that the capacity of the vehicle electrical system is between 200 and 300 watts, they actuate the power switch 14, in order to disconnect group 1 from the vehicle electrical system, the power switch 15 being actuated essentially at the same time in order to turn on group 2. Accordingly, when the power available from the vehicle electrical system is between 200 and 300 watts, a heating power of 200 watts is used. The method can be continued correspondingly until group 4, in the case of which there is then a total rated heating power of 400 watts. After the 400-watt level has been exceeded, a wide variety of combinations of the individual groups 1, 2, 3, 4 can be obtained in terms of power, on the basis of being driven by the electronics 20. In the example indicated here, there is a particular advantage in that the total system has some degree of redundancy. When the heating power is in the range of from 500 to 700 watts, this power may alternatively be provided by turning on in combination either groups 1 and 4 or 2 and 3 to provide 500 watts of heating power, and groups 1, 2 and 3 or 4 and 2 to provide a heating power of 600 watts. It may be generally stated that, with the example indicated here, a very finely controllable total rated heating power can be provided, so that the maximum occurring unused power loss works out at 100 watts, or the rated heating power of the smallest group.

In a second example, the rated powers of the groups 1, 2, 3, 4 are respectively about 100 watts, 200 watts, 400 watts and 800 watts. In this example, graduation is essentially obtained with a comparable increment, i.e. about 100 watts, although the total rated heating power obtainable is 1500 watts. In order to obtain the individual total heating levels, the control system 9 with the electronics 20 and the power switches 14, 15, 16, 17 can deliver electricity to a selection of different groups 1, 2, 3, 4, at least on the basis of how much electrical power is available from the vehicle electrical system. Assuming that a capacity of something more than 600 watts is available from the vehicle, the circuit 9 could turn on groups 2 and 3 by means of the electronics 20 and the power switches 15, 16, with group 2 providing a heating power of 200 watts and group 3 a heating power of 400 watts. The various possible combinations for selecting groups 1, 2, 3, 4 comprise all the possible variants in this example, i.e. for a desired 100-watt increment step, for example, respectively group or groups: 1; 2; 1, 2; 3; 3, 1; 3, 2; 3, 2, 1; 4; 4, 1; 4, 2; 4, 2, 1; 4, 3; 4, 3, 1; 4, 3, 2; 4, 3, 2, 1.

It may be generally stated that, with the device according to the invention and the method according to the invention, it is possible to optimize efficiency since the variation in the power available from the vehicle electrical system can be accommodated better than in the prior art. The person skilled in the art should understand that the power values indicated are to be taken only as examples, intended to explain the principles of the invention. The person skilled in the art should further understand that, in addition, groups of heating resistors with power values corresponding to each other may also be provided. Finally, the person skilled in the art will also understand that non-linear stepped graduation may also be realized, e.g. if finer graduation is desired in the lower power spectrum than in a higher power spectrum.

What is claimed is:

1. An electrical heating device for a vehicle, having a plurality of heating resistors, which are connected in groups, and having a circuit by means of which one or more groups can be turned on selectively, wherein the circuit can automatically turn on, without user supervision, a selection of the groups at least on the basis of the available electrical power and at least two of the groups have different rated heating power such that the maximum occurring unused power loss is the rated heating power of the group with the smallest rated heating power, wherein the rated heating power of at least one group may substantially satisfy the following equation:

$$P_n = P_1 + (n-1) \times P_1$$

where, in a series of groups with different rated heating power in order of increasing power, n denotes a group, wherein the rated heating power of at least one group may substantially satisfy the following equation:

$$P_n = 2^{(n-1)} \times P_1$$

where, in a series of groups with different rated heating power in order of increasing heating power, n denotes a group.

2. The device of claim 1, wherein the group with the lowest rated heating power provides a temperature increase, for the medium to be heated up, in the operating range.

3. The device of claim 1, wherein the maximum difference in rated heating power between at least two groups provides a temperature increase, for the medium to be heated up, of at most 1 kelvin in the operating range.

4. The device of claim 1, wherein the selection provides a total rated heating power graduation, in particular with an increment which corresponds to a temperature increase, for the medium to be heated up, of at most 1 kelvin in the operating range.

5. The device of claim 1, wherein the heating resistors are PTC heating thermistors.

* * * * *